United States Patent
Zhang et al.

(10) Patent No.: US 11,519,526 B2
(45) Date of Patent: Dec. 6, 2022

(54) EXTENSIBLE FLEXIBLE HOSE, AND METHOD FOR MANUFACTURING THEREOF

(71) Applicant: YANGJIANG NEW SPORTS TECHNOLOGY PRODUCTS CO., LTD., Guangdong (CN)

(72) Inventors: Zhiqiang Zhang, Yangjiang (CN); Song Chen, Yangjiang (CN)

(73) Assignee: YANGJIANG NEW SPORTS TECHNOLOGY PRODUCTS CO., LTD., Yangjiang (CN)

( * ) Notice: Subject to any disclaimer, the term of this patent is extended or adjusted under 35 U.S.C. 154(b) by 349 days.

(21) Appl. No.: 16/681,769

(22) Filed: Nov. 12, 2019

(65) Prior Publication Data

US 2021/0062939 A1 Mar. 4, 2021

(30) Foreign Application Priority Data

Aug. 26, 2019 (CN) .......................... 201910791261.2

(51) Int. Cl.
*F16L 11/08* (2006.01)
*B29K 105/08* (2006.01)
(Continued)

(52) U.S. Cl.
CPC .......... *F16L 11/085* (2013.01); *B29C 48/022* (2019.02); *B29C 48/09* (2019.02);
(Continued)

(58) Field of Classification Search
CPC ...... F16L 11/085; B29C 48/022; B29C 48/09; B29C 48/151; B29K 2105/0827; B29K 2995/0046; B29L 2023/005
(Continued)

(56) References Cited

U.S. PATENT DOCUMENTS 3,934,064 A * 1/1976 Lowthian ................. C08J 5/043
138/140
5,477,888 A * 12/1995 Mezzalira ............. F16L 11/085
138/125
(Continued)

FOREIGN PATENT DOCUMENTS

CN 1843745 A 10/2006
CN 102529130 A 7/2012
(Continued)

*Primary Examiner* — Craig M Schneider
*Assistant Examiner* — David R Deal
(74) *Attorney, Agent, or Firm* — Metis IP LLC

(57) ABSTRACT

The present invention discloses an extensible flexible hose comprise one elastic inner layer, one elastic textile reinforcement layer and one elastic outer layer, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the uncovered surface area of the elastic inner layer are reciprocally joined to form a unitary tubular member. The elastic textile reinforcement layer comprising a twill weave textile layer, with stretch yarns longitudinally distributed among. The objective of the present invention is to improve the phenomenon that the telescopic water pipe is liable to be damaged due to strong friction between inner core and outer sheath, to prolong the service life of the extensible flexible hose. The hose body adopts elastic materials, which has advantages as great elasticity, easy carrying, easy cleaning, and convenient storage.

8 Claims, 12 Drawing Sheets

(51) Int. Cl.
   *B29L 23/00* (2006.01)
   *B29C 48/00* (2019.01)
   *B29C 48/09* (2019.01)
   *B29C 48/151* (2019.01)

(52) U.S. Cl.
   CPC .... *B29C 48/151* (2019.02); *B29K 2105/0827* (2013.01); *B29K 2995/0046* (2013.01); *B29L 2023/005* (2013.01)

(58) Field of Classification Search
   USPC .......................................................... 138/118
   See application file for complete search history.

(56) References Cited

U.S. PATENT DOCUMENTS

| | | | | |
|---|---|---|---|---|
| 5,671,778 A * | 9/1997 | Sakuragi | ............... | B29C 63/343 264/269 |
| 6,508,276 B2 * | 1/2003 | Radlinger | ........... | F16L 55/1656 138/124 |
| 6,758,245 B2 * | 7/2004 | Troschitz | .............. | B29C 70/086 428/36.2 |
| 8,985,159 B2 * | 3/2015 | Caneva | ................. | F16L 11/085 138/123 |
| 9,182,057 B2 | 11/2015 | Ragner | | |
| 9,188,255 B2 * | 11/2015 | Litchfield | ................ | D04B 1/16 |
| 10,125,902 B2 * | 11/2018 | Chiang | .................. | B32B 5/028 |
| 10,927,983 B2 * | 2/2021 | Mezzalira | .............. | F16L 11/12 |
| 2011/0209791 A1 * | 9/2011 | Mezzalira | ................ | D04B 9/44 66/190 |
| 2013/0213514 A1 * | 8/2013 | Berardi | ................... | F16L 11/12 138/109 |
| 2016/0245430 A1 * | 8/2016 | Mezzalira | ................ | B32B 7/06 |
| 2018/0299038 A1 | 10/2018 | Mezzalira et al. | | |

FOREIGN PATENT DOCUMENTS

| | | |
|---|---|---|
| CN | 203215123 U | 9/2013 |
| CN | 205371860 U | 7/2016 |
| CN | 205439166 U | 8/2016 |
| CN | 106166813 A | 11/2016 |
| CN | 206456926 U | 9/2017 |
| CN | 207495985 U | 6/2018 |
| CN | 207874801 U | 9/2018 |

* cited by examiner

EXTENSIBLE FLEXIBLE HOSE, AND METHOD FOR MANUFACTURING THEREOF

CROSS-REFERENCE TO RELATED APPLICATIONS

This application claims priority to Chinese Patent Application No. 201910791261.2, filed on Aug. 26, 2019, the contents of which are incorporated herein by reference in their entirety.

TECHNICAL FIELD

The present invention relates to the technical field of telescopic water pipes, and in particular to an extensible flexible hose, and method for manufacturing thereof.

BACKGROUND

Currently, the existing telescopic water pipe on the market, mostly consist of inner core elastic tube and outer sheath, is an elastic tube, made of latex, rubber or a TPR thermoplastic elastomer as a raw material. Due to the high elasticity of the telescopic water pipe, when the telescopic water pipe is connected with 3-10 kg of pressurized water, under the protection by the outer sheath, the radial water-passing area and longitudinal length of the telescopic water pipe can be expanded to extend by 2-4 times; and when the pressurized water source is turned off, under the resilience force of the inner core elastic tube, the telescopic water pipe quickly discharges the residual water in the pipe and retracts to the original product size. Therefore, the telescopic water pipe is easy to use and is very popular among customers at home and abroad. However, the service life of the telescopic water pipe on the market is too low to meet people's expectations, also not convenient to store and easily stain the outer sheath.

Through detailed market research, it shows that 70% of the damage of the telescopic water pipe in use caused by strong friction between the inner tube and the outer sheath. To be specific, with the rapid expansion of the elastic tube after the telescopic water pipe connected with pressurized water, strong friction occurred between the inner tube and the outer sheath, and it caused another strong friction between the inner tube and the outer sheath when the pressurized water source disconnected. It also caused critical damage to the elastic tube in the process of use, while foreign particles such as sand grains enter the inner tube after passing through the outer sheath during stretch and retraction.

To solve the above defects, engineering technicians have made a lot of explorations, for example, Chinese patent No. 201320166720.6, which discloses a utility model entitled "TELESCOPIC WATER PIPE PROVIDED WITH PLASTIC FILM THEREIN". In this utility model, one layer of plastic film is additionally used between a water-passing inner core rubber tube and a crumpled outer sheath to reduce the degree of friction tear. However, as the plastic film has no elasticity and is not wear-resistant, in specific implementation of the technical solution the film is broke upon stretching out and drawing back for about forty times, and the broken film debris appears in clusters when the number of stretching out and drawing back reaches about sixty. The resultant clustered debris further increases the friction of the water-passing inner core of the telescopic water pipe. Therefore, although this solution has a certain protective effect on the water-passing inner core in the earlier stage of use, after the number of use reaches about 60 it will instead exert the effect of increasing the friction tear stress on the water-passing inner core, and thus it has not really solved the problem of improving the service life of the telescopic water pipe.

To counter the problems above, Chinese patent No. 201520897299.5, which discloses a utility model entitled "ABRASION RESISTANCE AND SYNCHRONOUS TELESCOPING WATER PIPE". In this utility model, a bamboo woven sheath is placed on the outer surface of the inner core, that the bamboo woven sheath and the inner core could have a synchronized stretch axially and radially which could reduce the friction between them effectively. But the length ratio between the bamboo woven sheath and the inner core is 6:1, which increase the weight of the water pipe significantly. Besides, the bamboo woven sheath is getting dirty easily, also make cleaning and storing inconvenient, and the weaving process is complicated as well. To further solve the above problems, Chinese patent No. 201720093703.2, which discloses a utility model entitled "PRESSURE AND WEAR RESISTANT FLEXIBLE HOSE WITHOUT WOVEN SHEATH". In this utility model, it discloses a flexible hose consist of an inner core elastic tube, a high-intensity wire layer and an elastic outer layer, which could avoid the strong friction between the inner tube and the outer layer in the process of use that cause a low service life, and has the advantages of easy carrying and easy cleaning. However, due to the setting of a high intensity wire layer, the radial expansion and longitudinal extension of the flexible hose is restricted, while the longitudinal length of the telescopic water pipe can only have a maximum 1.5 times elongation with respect to its original length. Solving the problem mentioned above, US patent US20180299038A1 discloses a telescopic water pipe with two-layer woven structure, including an inner layer and an outer layer made of an elastic polymeric material, and a first and second textile reinforcement layers which could stretch axially and radially interposed between the inner and the outer layers. To do so, the radial expansion the extensible flexible hose can be controlled and the longitudinal length of the telescopic water pipe can have a maximum 2.5 times elongation with respect to its original length, which could prolong the longitudinal length of the telescopic water pipe effectively. However, the textile reinforcement layers mainly contribute to the restriction of the expansion and determines the elongation of the hose as well, which decreases the elasticity of the flexible hose, and the manufacturing process of the hose is intricate. Also, the two textile reinforcement layers likely could break the connection within the hose, causing local overexpansion, that could break the unity of the flexible hose and lower its service life.

Therefore, it is an urgent problem to be solved by those skilled in the art how to change the current situation in which the telescopic water pipe is liable to be broken due to abrasion, stress, and the like in the prior art, and to prolong the service life of the telescopic water pipe, to make it simple and practical to be stored.

SUMMARY

An objective of the present invention is to provide an extensible flexible hose and method for manufacturing thereof, so as to solve the above problems existed in the prior art, to improve the phenomenon that the telescopic water pipe is liable to be damaged due to strong friction between inner core and outer sheath, to prolong the service life of the extensible flexible hose. The whole hose body is made of elastic materials, which has advantages as great elasticity, easy to carry, simple to clean, and convenient to store.

To achieve the above objective, the present invention provides the following solution:

An extensible flexible hose comprise one elastic inner layer, one elastic textile reinforcement layer and one elastic outer layer, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member. In other words, the one elastic outer layer and the one elastic inner layer may be reciprocally joined except at the regions occupied by the elastic textile reinforcement layer. The elastic textile reinforcement layer comprising a twill weave textile layer, which includes stretch yarns longitudinally distributed inside the twill weave textile layer.

The integrated combination of elastic inner layer, elastic textile reinforcement layer and elastic outer layer, providing a tubular member features with minimum bulkiness and compact structure, which changes the traditional flexible hose with the structure of the inner core and the outer sheath being separated. With the elasticity of the whole hoes body, it guarantees the hose could increasing its length of at maximum 5 times with respect to its original length under working pressure and retracting fast once the working pressure stops, which increases the working efficiency significantly.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of at maximum 7 times with respect to its original length under working pressure, and the elastic textile reinforcement layer also can withstand a working pressure of 8 to 30 bar, which has a relatively high burst pressure.

Preferably, the number of the stretch yarns among the elastic textile reinforcement layer ranges from 8 to 96, the diameter of the stretch yarn ranges from 0.25 mm to 2 mm.

In a preferred embodiment of the invention, the hose comprises one elastic inner layer, one elastic textile reinforcement layer and one elastic outer layer, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member. The elastic textile reinforcement layer is formed by a twill weave textile layer.

Preferably, the twill weave textile layer being made of in a material selected form the group consisting of polyester, polypropylene, nylon and acrylic fibres, while the yarn counts of the material using in the twill weave textile layer ranges from 10 D to 5000 D.

The twill weave textile layer is made of elastic materials and fiber materials, being prepared by twilled weaving, could restraining the radial enlargement but to yield in axial direction with the combined effect of the stretch yarns, further restricting the motion of both elastic inner layer and elastic outer layer to increase the utilization rate and to prolong the service life the extensible flexible hose.

Preferably, the elastic inner layer is made of thermoplastic elastomer material or rubber material, and the inner diameter of the elastic inner layer ranges from 3 mm to 95 mm, and the external diameter of the elastic inner layer ranges from 3.2 mm to 100 mm, and the thickness of the elastic inner layer ranges from 0.2 mm to 10 mm.

Preferably, the elastic outer layer is made of thermoplastic elastomer material or rubber material, and the thickness of the elastic outer layer ranges from 0.2 mm to 10 mm.

The elastic outer layer is processed by extrusion or coating process that could guarantee the tight junction between the elastic outer layer and the other two layers. On one hand, the elastic outer layer can effectively prevent small hard objects (e.g., grains of sand) entering the elastic textile reinforcement layer which could cause burst of elastic inner layer during the friction between the elastic textile reinforcement layer and the elastic inner layer to reduce its service life. On the other hand, the elastic inner layer and elastic textile reinforcement layer can be further joined due to existence of the elastic outer layer, which can guarantee the synchronous telescoping of the unitary tubular member and reduce the friction between the elastic textile reinforcement layer and elastic inner layer, can prolong the service life of stretch yarns. Meanwhile, the elastic outer layer also gives the hose a minimum bulkiness and compact structure that can contribute to a higher elongation and better elasticity, can further increase the working efficiency of the hose. Besides, the elastic outer layer is simple to clean and practical to be stored.

As used herein, with the expression "twill weave textile layer" or derivative thereof is meant a layer consisting of at least two yarns or groups of yarns laying on a supporting layer with opposite inclinations and connected to one another alternately to form a weave. In a weaving process, one yarn is interlaced with another yarn once above and then below the latter.

Advantageously, the elastic textile reinforcement layer of the extensible hose of the present invention may be susceptible to move between a rest configuration that has at rest, i.e. when the liquid does not flow through the unitary tubular member, and a working configuration that has when the unitary tubular member is actuated by the working pressure of the liquid flowing therethrough.

In the working configuration the elastic textile reinforcement layer only extends axially to accompany the elongation of the unitary tubular member.

In other words, for a given inner hose pressure the maximum axial elongation of the elastic textile reinforcement layer is the same as the maximum axial elongation of the unitary tubular member.

In fact, the elastic textile reinforcement layer ensures high burst pressure, and therefore greater durability of the hose. Moreover, thanks to the fact that the elastic outer layer is of thermoplastic elastomer material or rubber material, the flexible hose is simple and quick to clean. Further, the overall bulkiness of the flexible hose according to the present invention is minimal. This allows, for example, to store it in a very small space. It is moreover easily storable on a classic hose reel.

Preferably, two ends of the unitary tubular member are respectively provided with a joint, the joint comprises a convex connector, a pawl type snap joint, and a locking piece. The convex connector inserted into the end of the unitary tubular member, the pawl type snap joint connected to the exterior of the unitary tubular member, the locking piece fastened on the exterior of the pawl type snap joint.

The convex connector being a hollow structural connector, comprises a body part, a convex part, a spacing part, a screw thread part. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away. With the combined effect of locking piece and convex connector, the elastic inner layer could be connected tightly on the exterior of the convex part, making sure the tubular member stay within the joint under working pressure.

Preferably, the joint provided with one of the following connector structures at an end away from the unitary tubular member: a quick-connect connection structure, an internally threaded joint structure or an externally threaded joint structure.

The hose can be manufactured by a method which may include in sequence the following steps: a) providing an elastic inner layer formed by extruding or coating; b) elongating between 2 to 7 times of the elastic inner layer with respect to its original length, and placing an elastic textile reinforcement layer on the elongated elastic inner layer to obtain a semifinished hose; c) extruding or coating an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of extruding or coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station, braiding station, coating station.

Advantageously, the elastic inner layer formed by an extruding station or a coating station, and the elastic textile reinforcement layer placed on the outer surface of the elongated elastic inner layer by braiding station to obtain a semifinished hose, then the elastic outer layer extruding or coating on the semifinished hose by extruding station or coating station respectively to form a unitary tubular member.

Must be noted that, methods and equipment of manufacturing in the prior art can be used to produce the hose in this invention. For instance, an example of coating process is known from document CN Pat. No. 2016107644189, whereas an example of coating process and processing equipment is known from document CN Pat. No. 2011104581255. Examples of extruding station are known from multiple documents such as CN Pat. No. 2018201633039, CN Pat. No. 2016201292321, CN Pat. No. 2017203694193, whereas an example of extrusion is known from document CN Pat. No. 2006100134459.

In a preferred embodiment of the invention, the hose can be manufactured by a method which may include in sequence the following steps: a) providing an elastic inner layer formed by extruding or coating; b) elongating between 2 to 7 times of the stretch yarns with respect to its original length, then interlaced with one another inside a twill weave textile layer to form an elastic textile reinforcement layer, and placing the elastic textile reinforcement layer on the elastic inner layer at the same time to obtain a semifinished hose; c) extruding or coating an elastic outer layer on the semifinished hose.

Preferably, the step b) of placing an elastic textile reinforcement layer includes a step of the one elastic inner layer reciprocally coupling to the inner surface of elongated elastic textile reinforcement layer to obtain a semifinished hose.

Preferably, the step c) of extruding or coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station, braiding station, coating station.

Advantageously, the elastic inner layer formed by an extruding station or a coating station, and the elastic textile reinforcement layer disposed on the elastic inner layer by braiding station to obtain a semifinished hose, then the elastic outer layer extruding or coating on the semifinished hose by extruding station or coating station respectively to form a unitary tubular member.

Thanks to one or more of the above features, the above extendable hose can be manufactured in a simple and fast manner. In fact, the extensible hose can be manufactured automatically in line, without the aid of human operators.

The present invention provides an extensible flexible hose with an integrated tubular member form, which changes the traditional flexible hose with structure of the inner core and the outer sheath being separated, had overcome the disadvantage of short service life due to strong friction between the inner core and outer sheath of the traditional hose. Besides, with the elasticity of the whole hoes body and the disposition of elastic textile reinforcement layer, it guarantees the hose could increase its length of at maximum 5 times with respect to its original length under working pressure and retracting fast once the working pressure stops, which increases the working efficiency significantly and makes it convenient to store. Moreover, the elastic outer layer is made of thermoplastic elastomer material or rubber material, which makes it simple to clean.

The present invention also provides a production line set up by the combination of a selected group consisting of extruding station, braiding station, coating station, which can adjust to various manufacturing conditions, has advantages as low operation cost, simple process, etc.

DETAILED DESCRIPTION

Figure 1:
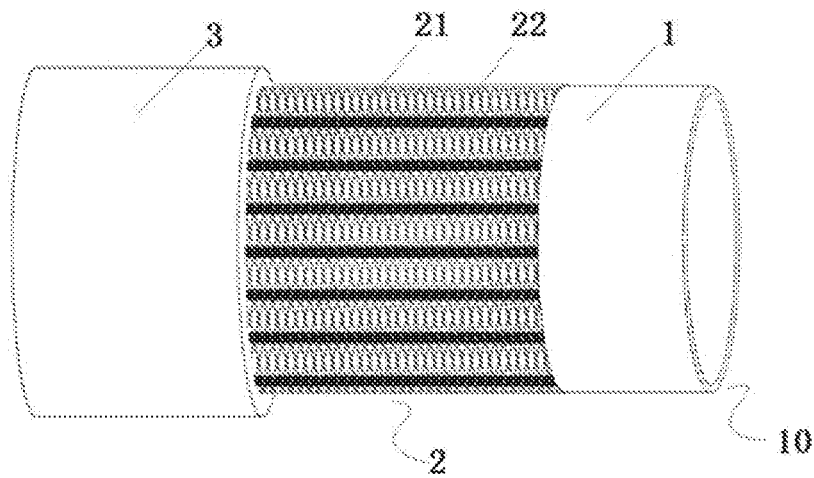
FIG. 1 is a schematic view of an embodiment of the hose at rest.
Figure 2:
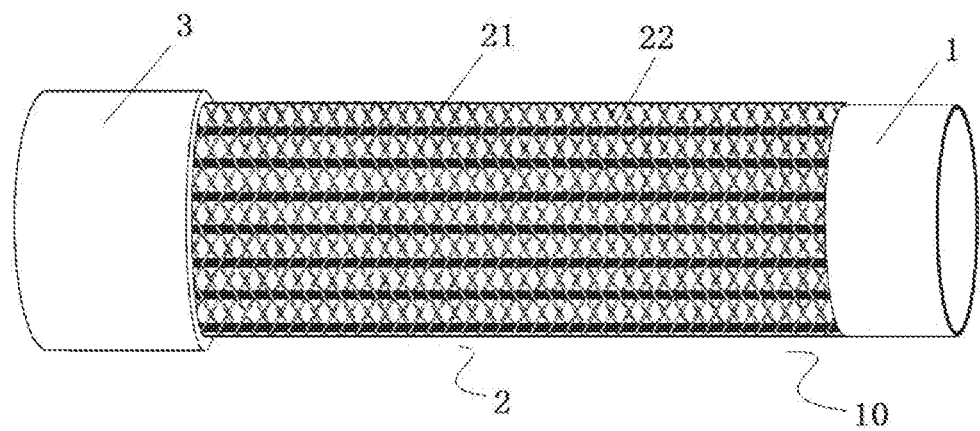
FIG. 2 is a schematic view of an embodiment of the hose under pressure.
Figure 3:
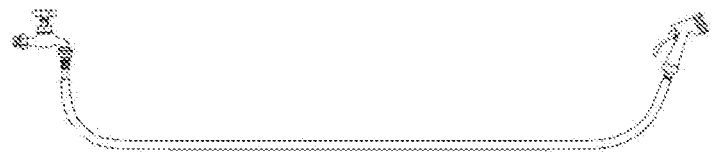
FIG. 3 is a schematic view of an embodiment of the hose during use.
Figure 4:
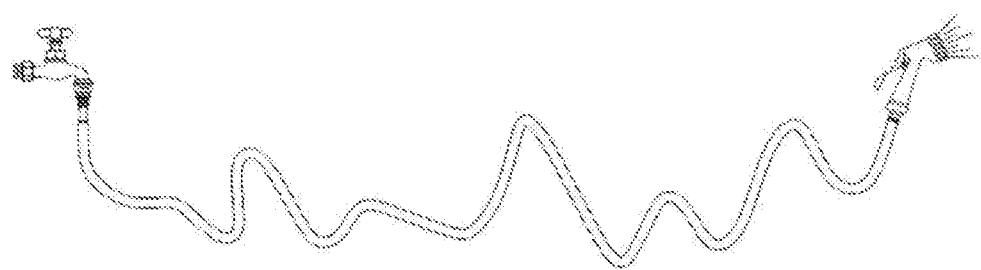
FIG. 4 is a schematic view of an embodiment of the hose during use.
Figure 5:
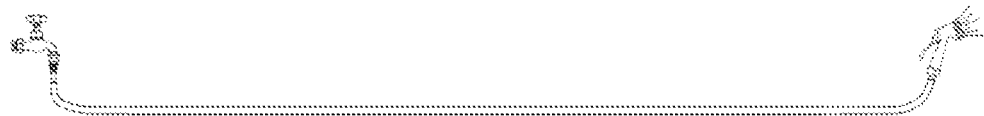
FIG. 5 is a schematic view of an embodiment of the hose during use.
Figure 6:
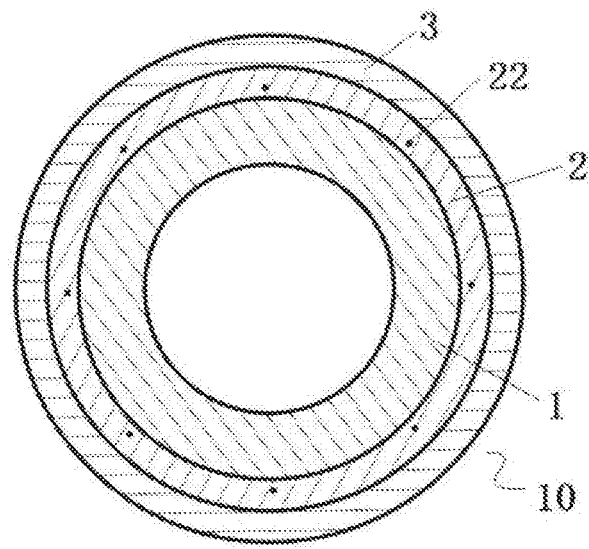
FIG. 6 is a radial sectional view of the embodiment of the hose.
Figure 7:
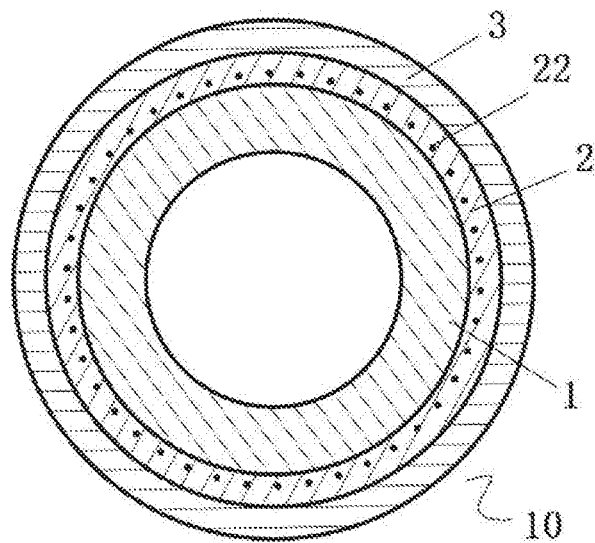
FIG. 7 is a radial sectional view of the embodiment of the hose.
Figure 8:
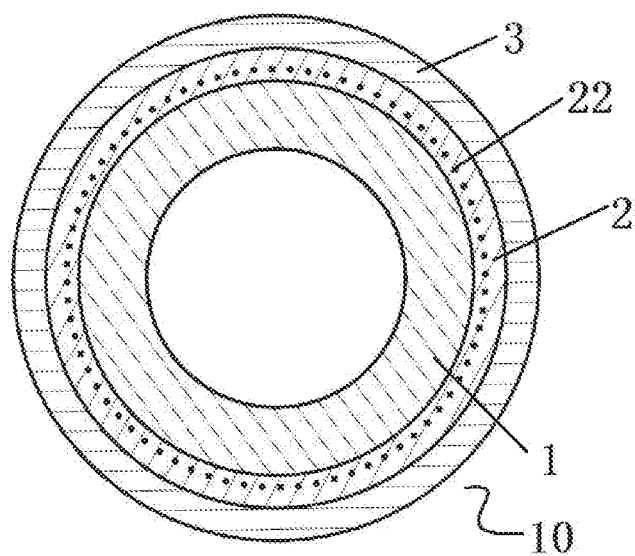
FIG. 8 is a radial sectional view of the embodiment of the hose.
Figure 9:
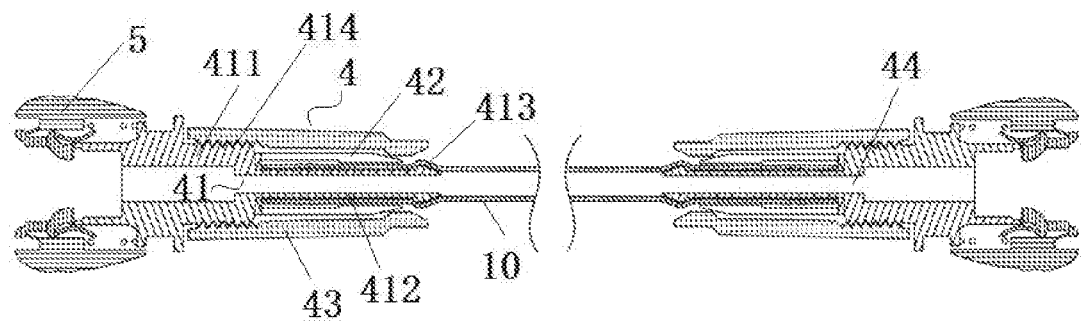
FIG. 9 is a schematic view of an embodiment of the hose connected with connector structures.
Figure 10:
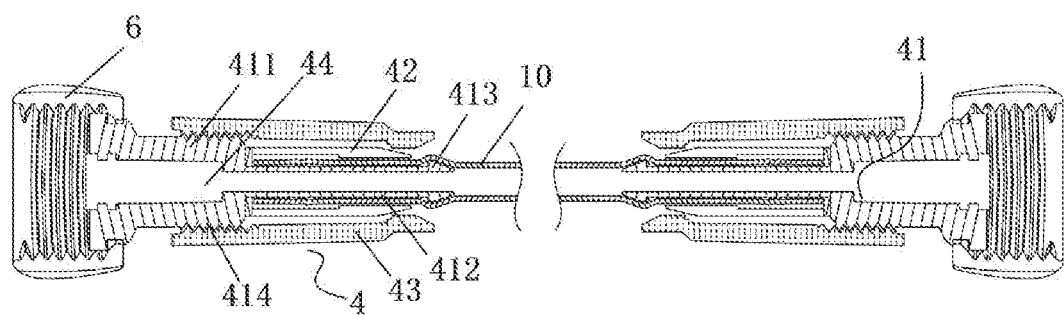
FIG. 10 is a schematic view of an embodiment of the hose connected with connector structures.
Figure 11:
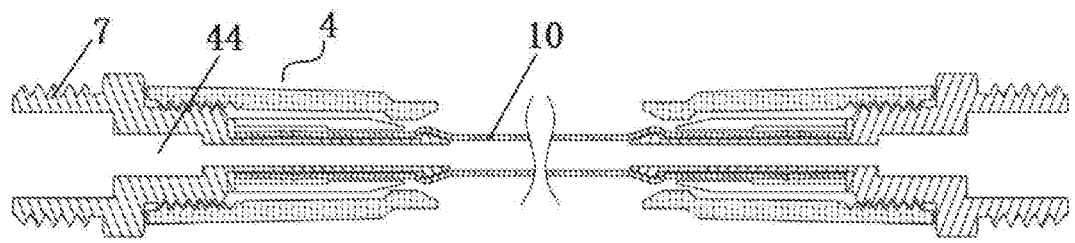
FIG. 11 is a schematic view of an embodiment of the hose connected with connector structures.
Figure 12:
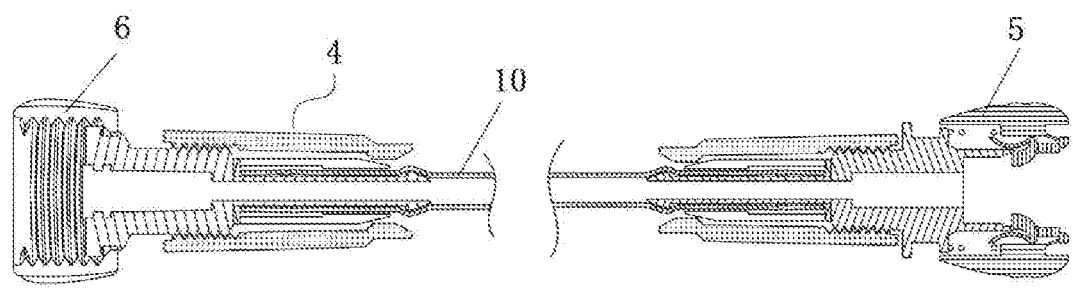
FIG. 12 is a schematic view of an embodiment of the hose connected with connector structures.
Figure 13:
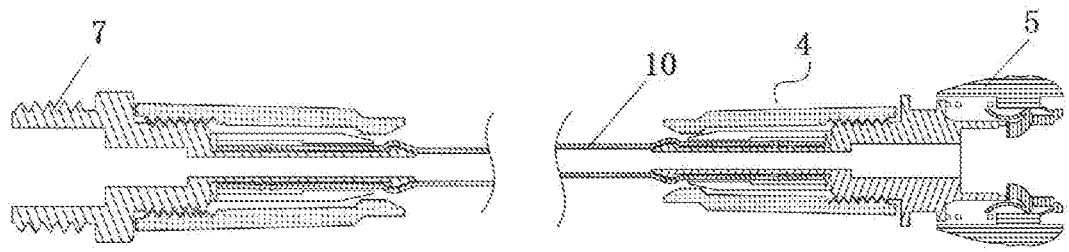
FIG. 13 is a schematic view of an embodiment of the hose connected with connector structures.
Figure 14:
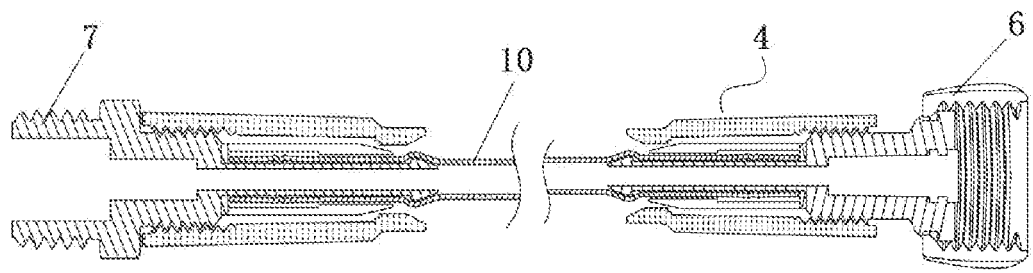
FIG. 14 is a schematic view of an embodiment of the hose connected with connector structures.

The present invention will be described hereinafter with reference to the embodiments, from which the technical solutions will be clear and complete. Obviously, the described embodiments constitute only a part of the embodiments of the present invention, but not all of the embodiments.

Embodiment 1

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside the twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 4.6 times with respect to its original length under working pressure of 6 bar. The elastic textile reinforcement layer increases its length of at maximum 7 times with respect to its original length under working pressure, and the elastic textile reinforcement layer also can withstand a working pressure of 8 bar, which has a relatively high burst pressure.

Preferably, the number of the stretch yarns among the elastic textile reinforcement layer is 8, the diameter of the stretch yarn is 1.2 mm.

Preferably, the twill weave textile layer being made of polypropylene, while the yarn counts of the material using in the twill weave textile layer is 800 D.

Preferably, the elastic inner layer is made of thermoplastic elastomer material, and the inner diameter of the elastic inner layer is 6 mm, and the external diameter of the elastic inner layer is 9 mm, and the thickness of the elastic inner layer is 1.5 mm.

Preferably, the elastic outer layer is made of thermoplastic elastomer material, and the thickness of the elastic outer layer is 1 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 2

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10.

In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside the twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 3 times with respect to its original length under working pressure of 8 bar. The elastic textile reinforcement layer increases its length of at maximum 4.5 times with respect to its original length under working pressure, and the elastic textile reinforcement layer also can withstand a working pressure of 10 bar, which has a relatively high burst pressure.

Preferably, the number of the stretch yarns among the elastic textile reinforcement layer is 16, the diameter of the stretch yarn is 0.7 mm.

Preferably, the twill weave textile layer being made of polyester, while the yarn counts of the material using in the twill weave textile layer is 600 D.

Preferably, the elastic inner layer is made of thermoplastic elastomer material, and the inner diameter of the elastic inner layer is 9 mm, and the external diameter of the elastic inner layer is 12 mm, and the thickness of the elastic inner layer is 1.5 mm.

Preferably, the elastic outer layer is made of thermoplastic elastomer material, and the thickness of the elastic outer layer is 2 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 3

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside the twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 1.8 times with respect to its original length under working pressure of 15 bar. The elastic textile reinforcement layer increases its length of at maximum 3 times with respect to its original length under working pressure, and the elastic textile reinforcement layer also can withstand a working pressure of 30 bar, which has a relatively high burst pressure.

Preferably, the number of the stretch yarns among the elastic textile reinforcement layer is 48, the diameter of the stretch yarn is 2 mm.

Preferably, the twill weave textile layer being made of nylon, while the yarn counts of the material using in the twill weave textile layer is 3000 D.

Preferably, the elastic inner layer is made of rubber material, and the inner diameter of the elastic inner layer is 20 mm, and the external diameter of the elastic inner layer is 30 mm, and the thickness of the elastic inner layer is 5 mm.

Preferably, the elastic outer layer is made of rubber material, and the thickness of the elastic outer layer is 4 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 4

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside the twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 2.5 times with respect to its original length under working pressure of 10 bar. The elastic textile reinforcement layer increases its length of at maximum 4 times with respect to its original length under working pressure, and the elastic textile reinforcement layer also can withstand a working pressure of 20 bar, which has a relatively high burst pressure.

Preferably, the number of the stretch yarns among the elastic textile reinforcement layer is 24, the diameter of the stretch yarn is 1 mm.

Preferably, the twill weave textile layer being made of acrylic fibres, while the yarn counts of the material using in the twill weave textile layer is 1000 D.

Preferably, the elastic inner layer is made of rubber material, and the inner diameter of the elastic inner layer is 12 mm, and the external diameter of the elastic inner layer is 16 mm, and the thickness of the elastic inner layer is 2 mm.

Preferably, the elastic outer layer is made of rubber material, and the thickness of the elastic outer layer is 2 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 5

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 1.5 times with respect to its original length under working pressure of 7 bar. The elastic textile reinforcement layer increases its length of at maximum 2.5 times with respect to its original length under working pressure, and the elastic textile reinforcement layer also can withstand a working pressure of 15 bar, which has a relatively high burst pressure.

Preferably, the number of the stretch yarns among the elastic textile reinforcement layer is 96, the diameter of the stretch yarn is 1.5 mm.

Preferably, the twill weave textile layer being made of polypropylene, while the yarn counts of the material using in the twill weave textile layer is 5000 D.

Preferably, the elastic inner layer is made of thermoplastic elastomer material, and the inner diameter of the elastic inner layer is 72 mm, and the external diameter of the elastic inner layer is 86 mm, and the thickness of the elastic inner layer is 8 mm.

Preferably, the elastic outer layer is made of rubber material, and the thickness of the elastic outer layer is 5 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 6

An extensible flexible hose comprise one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. In other words, the one elastic outer layer and the one elastic inner layer may be reciprocally joined except at the regions occupied by the elastic textile reinforcement layer. The elastic textile reinforcement layer comprising a twill weave textile layer 21, which includes stretch yarns 22 longitudinally distributed inside twill weave textile layer, as shown in FIGS. 1-2 and FIGS. 19-20.

Preferably, the twill weave textile layer is prepared by twilled weaving, while the stretch yarns being parallelly woven in between. And the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 3.5 times with respect to its original length under working pressure of 15 bar. The elastic textile reinforcement layer increases its length of at maximum 5.5 times with respect to its original length under working pressure, and the elastic textile reinforcement layer also can withstand a working pressure of 25 bar, which has a relatively high burst pressure.

Preferably, the number of the stretch yarns among the elastic textile reinforcement layer is 48, the diameter of the stretch yarn is 1.2 mm.

Preferably, the twill weave textile layer being made of nylon, while the yarn counts of the material using in the twill weave textile layer is 500 D.

Preferably, the elastic inner layer is made of rubber material, and the inner diameter of the elastic inner layer is 40 mm, and the external diameter of the elastic inner layer is 52 mm, and the thickness of the elastic inner layer is 6 mm.

Preferably, the elastic outer layer is made of thermoplastic elastomer material, and the thickness of the elastic outer layer is 5 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 7

The hose mentioned in embodiment 1-6 can be manufactured by a method which may include in sequence the following steps: a) providing an elastic inner layer formed by extruding; b) elongating 6 times of the stretch yarns with respect to its original length and interlaced with one another inside a twill weave textile layer to form an elastic textile reinforcement layer, elongating 6 times of the elastic inner layer with respect to its original length simultaneously, then placing the elongated elastic textile reinforcement layer on the elongated elastic inner layer to obtain a semifinished hose; c) extruding an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Figure 18:
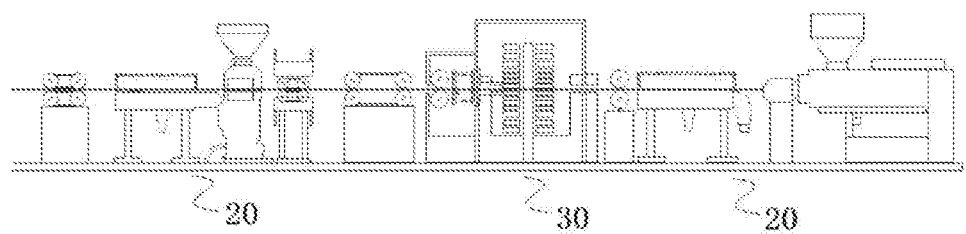
FIG. 18 is a schematic side view of an embodiment of the production line.
Figure 19:
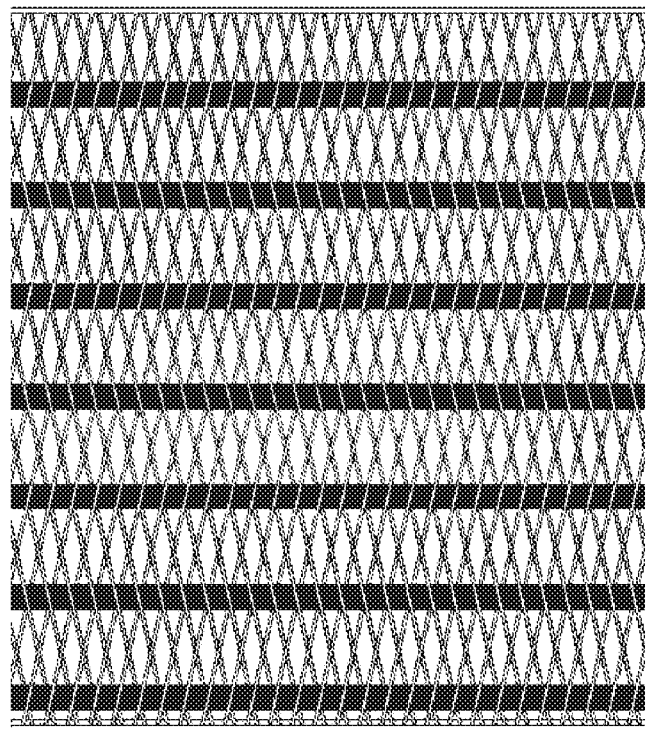
FIG. 19 is a schematic side view of an embodiment of elastic textile reinforcement layer at rest.
Figure 20:
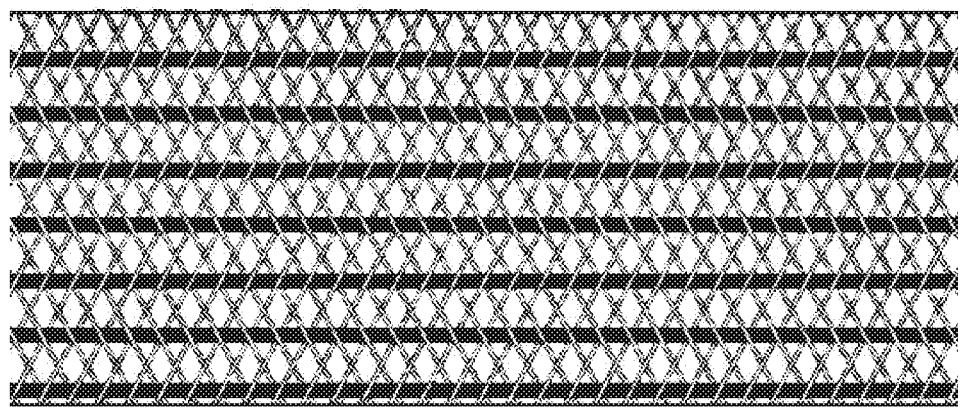
FIG. 20 is a schematic side view of an embodiment of elastic textile reinforcement layer under pressure.
Figure 21:
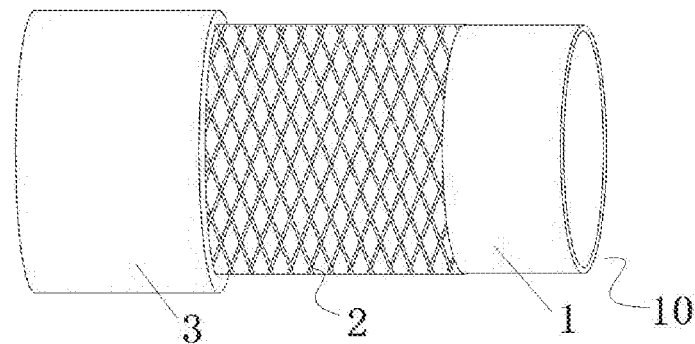
FIG. 21 is a schematic view of an embodiment of the hose at rest.
Figure 22:
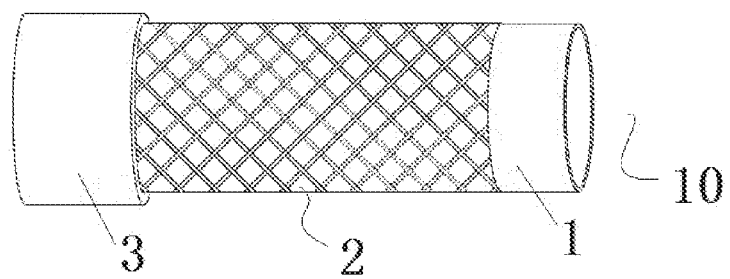
FIG. 22 is a schematic view of an embodiment of the hose under pressure.
Figure 23:
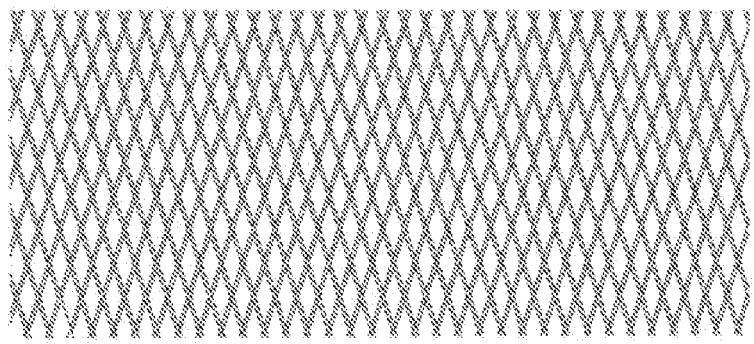
FIG. 23 is a schematic side view of an embodiment of elastic textile reinforcement layer at rest.
Figure 24:
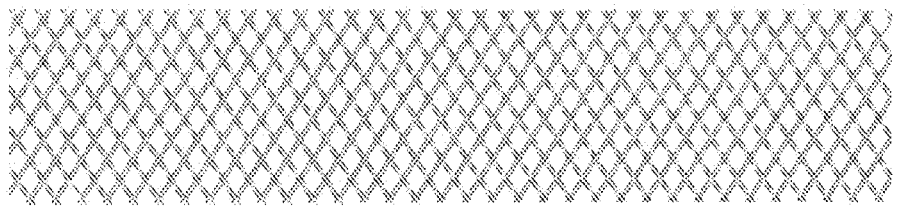
FIG. 24 is a schematic side view of an embodiment of elastic textile reinforcement layer under pressure.

Advantageously, the elastic inner layer formed by an extruding station, and the elastic textile reinforcement layer placed on the outer surface of the elongated elastic inner layer by braiding station to obtain a semifinished hose, then the elastic outer layer extruding on the semifinished hose by extruding station to form a unitary tubular member, as shown in FIG. 18.

Embodiment 8

The hose mentioned in embodiment 1-6 can be manufactured by a method which may include in sequence the following steps: a) providing an elastic inner layer formed by extruding; b) elongating 2 times of the stretch yarns with respect to its original length and interlaced with one another inside a twill weave textile layer to form an elastic textile reinforcement layer, elongating 2 times of the elastic inner layer with respect to its original length simultaneously, then placing the elongated elastic textile reinforcement layer on the elongated elastic inner layer to obtain a semifinished hose; c) coating an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Figure 16:
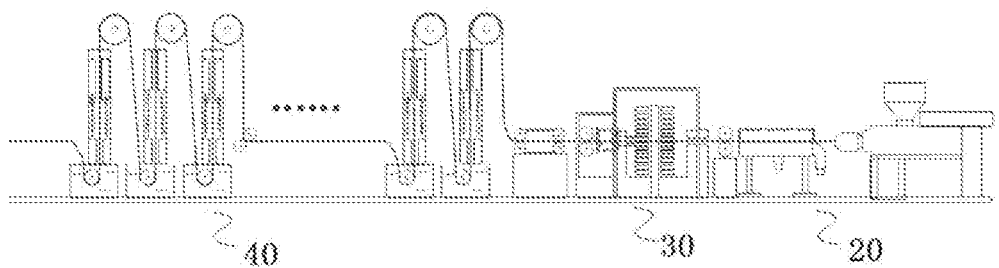
FIG. 16 is a schematic side view of an embodiment of the production line.

Advantageously, the elastic inner layer formed by an extruding station, and the elastic textile reinforcement layer placed on the outer surface of the elongated elastic inner layer by braiding station to obtain a semifinished hose, then the elastic outer layer coating on the semifinished hose by coating station to form a unitary tubular member, as shown in FIG. 16.

Embodiment 9

The hose mentioned in embodiment 1-6 can be manufactured by a method which may include in sequence the following steps: a) providing an elastic inner layer formed by coating; b) elongating 4 times of the stretch yarns with respect to its original length and interlaced with one another inside a twill weave textile layer to form an elastic textile reinforcement layer, elongating 4 times of the elastic inner layer with respect to its original length simultaneously, then placing the elongated elastic textile reinforcement layer on the elongated elastic inner layer to obtain a semifinished hose; c) coating an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Figure 15:
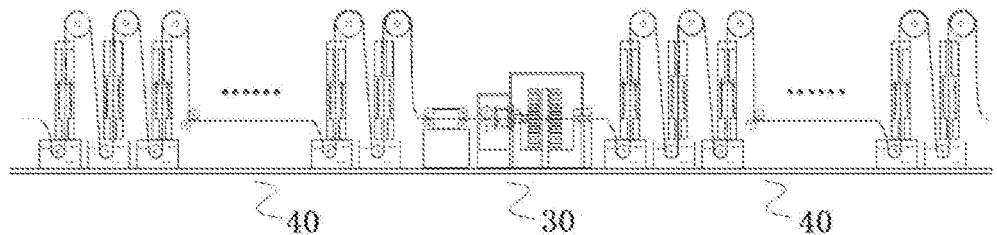
FIG. 15 is a schematic side view of an embodiment of the production line.

Advantageously, the elastic inner layer formed by a coating station, and the elastic textile reinforcement layer placed on the outer surface of the elongated elastic inner layer by braiding station to obtain a semifinished hose, then the elastic outer layer coating on the semifinished hose by coating station to form a unitary tubular member, as shown in FIG. 15.

Embodiment 10

The hose mentioned in embodiment 1-6 can be manufactured by a method which may include in sequence the following steps: a) providing an elastic inner layer formed by coating; b) elongating 7 times of the stretch yarns with respect to its original length and interlaced with one another inside a twill weave textile layer to form an elastic textile reinforcement layer, elongating 7 times of the elastic inner layer with respect to its original length simultaneously, then placing the elongated elastic textile reinforcement layer on the elongated elastic inner layer to obtain a semifinished hose; c) extruding an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Figure 17:
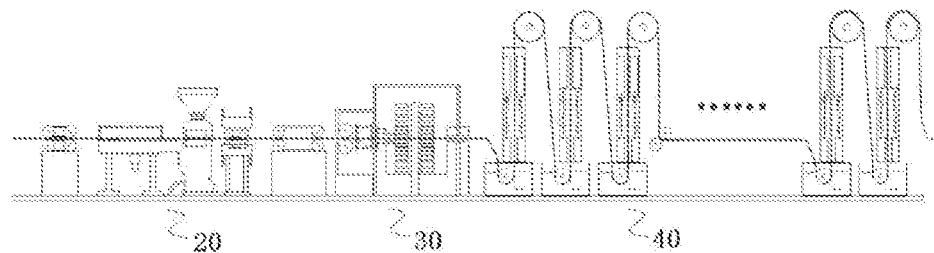
FIG. 17 is a schematic side view of an embodiment of the production line.

Advantageously, the elastic inner layer formed by a coating station, and the elastic textile reinforcement layer placed on the outer surface of the elongated elastic inner layer by braiding station to obtain a semifinished hose, then the elastic outer layer extruding on the semifinished hose by extruding station to form a unitary tubular member, as shown in FIG. 17.

Embodiment 11

The hose mentioned in embodiment 1-6 can be manufactured by a method which may include in sequence the following steps: a) providing an elastic inner layer formed by extruding; b) elongating 6 times of the stretch yarns with respect to its original length, then interlaced with one another inside a twill weave textile layer to form an elastic textile reinforcement layer, and placing the elastic textile reinforcement layer on the elastic inner layer at the same time to obtain a semifinished hose; c) extruding an elastic outer layer on the semifinished hose.

Preferably, the step b) of placing an elastic textile reinforcement layer includes a step of the one elastic inner layer reciprocally coupling to the inner surface of elongated elastic textile reinforcement layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by an extruding station, and the elastic textile reinforcement layer disposed on the elastic inner layer by braiding station to obtain a semifinished hose, then the elastic outer layer extruding on the semifinished hose by extruding station to form a unitary tubular member, as shown in FIG. 18.

Embodiment 12

The hose mentioned in embodiment 1-6 can be manufactured by a method which may include in sequence the following steps: a) providing an elastic inner layer formed by extruding; b) elongating 2 times of the stretch yarns with respect to its original length, then interlaced with one another inside a twill weave textile layer to form an elastic textile reinforcement layer, and placing the elastic textile reinforcement layer on the elastic inner layer at the same time to obtain a semifinished hose; c) coating an elastic outer layer on the semifinished hose.

Preferably, the step b) of placing an elastic textile reinforcement layer includes a step of the one elastic inner layer reciprocally coupling to the inner surface of elongated elastic textile reinforcement layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by an extruding station, and the elastic textile reinforcement layer disposed on the elastic inner layer by braiding station to obtain a semifinished hose, then the elastic outer layer coating on the semifinished hose by coating station to form a unitary tubular member, as shown in FIG. 16.

Embodiment 13

The hose mentioned in embodiment 1-6 can be manufactured by a method which may include in sequence the following steps: a) providing an elastic inner layer formed by coating; b) elongating 4 times of the stretch yarns with respect to its original length, then interlaced with one another inside a twill weave textile layer to form an elastic textile reinforcement layer, and placing the elastic textile reinforcement layer on the elastic inner layer at the same time to obtain a semifinished hose; c) coating an elastic outer layer on the semifinished hose.

Preferably, the step b) of placing an elastic textile reinforcement layer includes a step of the one elastic inner layer reciprocally coupling to the inner surface of elongated elastic textile reinforcement layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by a coating station, and the elastic textile reinforcement layer disposed on the elastic inner layer by braiding station to obtain a semifinished hose, then the elastic outer layer coating on the semifinished hose by coating station to form a unitary tubular member, as shown in FIG. 15.

Embodiment 14

The hose mentioned in embodiment 1-6 can be manufactured by a method which may include in sequence the following steps: a) providing an elastic inner layer formed by coating; b) elongating 7 times of the stretch yarns with respect to its original length, then interlaced with one another inside a twill weave textile layer to form an elastic textile reinforcement layer, and placing the elastic textile reinforcement layer on the elastic inner layer at the same time to obtain a semifinished hose; c) extruding an elastic outer layer on the semifinished hose.

Preferably, the step b) of placing an elastic textile reinforcement layer includes a step of the one elastic inner layer reciprocally coupling to the inner surface of elongated elastic textile reinforcement layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by a coating station, and the elastic textile reinforcement layer disposed on the elastic inner layer by braiding station to obtain a semifinished hose, then the elastic outer layer extruding on the semifinished hose by extruding station to form a unitary tubular member, as shown in FIG. 17.

Embodiment 15

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 4.6 times with respect to its original length under working pressure of 6 bar. The elastic textile reinforcement layer increases its length of at maximum 7 times with respect to its original length under working pressure, and the elastic textile reinforcement layer also can withstand a working pressure of 8 bar, which has a relatively high burst pressure.

Preferably, the twill weave textile layer being made of polypropylene, while the yarn counts of the material using in the twill weave textile layer is 800 D.

Preferably, the elastic inner layer is made of thermoplastic elastomer material, and the inner diameter of the elastic inner layer is 6 mm, and the external diameter of the elastic inner layer is 9 mm, and the thickness of the elastic inner layer is 1.5 mm.

Preferably, the elastic outer layer is made of thermoplastic elastomer material, and the thickness of the elastic outer layer is 1 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 16

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 3 times with respect to its original length under working pressure of 8 bar. The elastic textile reinforcement layer increases its length of at maximum 4.5 times with respect to its original length under working pressure, and the elastic textile reinforcement layer also can withstand a working pressure of 10 bar, which has a relatively high burst pressure.

Preferably, the twill weave textile layer being made of polyester, while the yarn counts of the material using in the twill weave textile layer is 600 D.

Preferably, the elastic inner layer is made of thermoplastic elastomer material, and the inner diameter of the elastic inner layer is 9 mm, and the external diameter of the elastic inner layer is 12 mm, and the thickness of the elastic inner layer is 1.5 mm.

Preferably, the elastic outer layer is made of thermoplastic elastomer material, and the thickness of the elastic outer layer is 2 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 17

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 1.8 times with respect to its original length under working pressure of 15 bar. The elastic textile reinforcement layer increases its length of at maximum 3 times with respect to its original length under working pressure, and the elastic textile reinforcement layer also can withstand a working pressure of 30 bar, which has a relatively high burst pressure.

Preferably, the twill weave textile layer being made of nylon, while the yarn counts of the material using in the twill weave textile layer is 3000 D.

Preferably, the elastic inner layer is made of rubber material, and the inner diameter of the elastic inner layer is 20 mm, and the external diameter of the elastic inner layer is 30 mm, and the thickness of the elastic inner layer is 5 mm.

Preferably, the elastic outer layer is made of rubber material, and the thickness of the elastic outer layer is 4 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 18

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer are not covered by the elastic textile reinforcement layer reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 2.5 times with respect to its original length under working pressure of 10 bar. The elastic textile reinforcement layer increases its length of at maximum 4 times with respect to its original length under working pressure, and the elastic textile reinforcement layer also can withstand a working pressure of 20 bar, which has a relatively high burst pressure.

Preferably, the twill weave textile layer being made of acrylic fibres, while the yarn counts of the material using in the twill weave textile layer is 1000 D.

Preferably, the elastic inner layer is made of rubber material, and the inner diameter of the elastic inner layer is 12 mm, and the external diameter of the elastic inner layer is 16 mm, and the thickness of the elastic inner layer is 2 mm.

Preferably, the elastic outer layer is made of rubber material, and the thickness of the elastic outer layer is 2 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 19

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 1.5 times with respect to its original length under working pressure of 7 bar. The elastic textile reinforcement layer increases its length of at maximum 2.5 times with respect to its original length under working pressure, and the elastic textile reinforcement layer also can withstand a working pressure of 15 bar, which has a relatively high burst pressure.

Preferably, the twill weave textile layer being made of polypropylene, while the yarn counts of the material using in the twill weave textile layer is 5000 D.

Preferably, the elastic inner layer is made of thermoplastic elastomer material, and the inner diameter of the elastic inner layer is 72 mm, and the external diameter of the elastic inner layer is 86 mm, and the thickness of the elastic inner layer is 8 mm.

Preferably, the elastic outer layer is made of rubber material, and the thickness of the elastic outer layer is 5 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 20

An extensible flexible hose comprises one elastic inner layer 1, one elastic textile reinforcement layer 2 and one elastic outer layer 3, where the elastic textile reinforcement layer placed on the outer surface of the elastic inner layer, the elastic outer layer disposed on the elastic textile reinforcement layer, while the elastic inner layer and the elastic textile reinforcement layer are reciprocally coupled, the elastic outer layer and the surface area of the elastic inner layer not covered by the elastic textile reinforcement layer are reciprocally joined to form a unitary tubular member 10. The elastic textile reinforcement layer is formed by a twill weave textile layer, as shown in FIGS. 21-24.

Preferably, the twill weave textile layer is prepared by twilled weaving, and the elastic textile reinforcement layer has an axial elasticity and a radial constraint force, that allows the elastic textile reinforcement layer automatically elongating and restricts the elastic textile reinforcement layer from automatically enlarging under working pressure given by a liquid flowing therethrough.

Preferably, the elastic textile reinforcement layer increases its length of 3.5 times with respect to its original length under working pressure of 15 bar. The elastic textile reinforcement layer increases its length of at maximum 5.5 times with respect to its original length under working pressure, and the elastic textile reinforcement layer also can withstand a working pressure of 25 bar, which has a relatively high burst pressure.

Preferably, the twill weave textile layer being made of nylon, while the yarn counts of the material using in the twill weave textile layer is 500 D.

Preferably, the elastic inner layer is made of rubber material, and the inner diameter of the elastic inner layer is 40 mm, and the external diameter of the elastic inner layer is 52 mm, and the thickness of the elastic inner layer is 6 mm.

Preferably, the elastic outer layer is made of thermoplastic elastomer material, and the thickness of the elastic outer layer is 5 mm.

Preferably, two ends of the unitary tubular member are respectively provided with a joint 4, the joint comprises a convex connector 41, a pawl type snap joint 42, and a locking piece 43. The convex connector inserted into the end of the unitary tubular member, the pawl type snap joint connected to the exterior of the unitary tubular member, the locking piece fastened on the exterior of the pawl type snap joint. The joint also has a through-hole 44 within, which can connect to the inner space of elastic inner layer.

The convex connector being a hollow structural connector, comprises a body part 411, a convex part 412, a spacing part 413, a screw thread part 414. The body part connected with the convex part, the end of the convex part connected with the spacing part, the screw thread part set on the exterior of the body part, the screw thread part also connected with the locking piece. The joint designed to be removably connected with the unitary tubular member, while the spacing part can prevent the elastic inner layer from moving away.

Preferably, the joint provided with one of the following connector structures at an end away from the unitary tubular member: a quick-connect connection structure 5, an internally threaded joint structure 6 or an externally threaded joint structure 7.

Embodiment 21

The hose mentioned in embodiment 15-20 can be manufactured by a method which may include in sequence the following steps: a) providing an elastic inner layer formed by extruding; b) elongating 6 times of the elastic inner layer with respect to its original length, and placing an elastic textile reinforcement layer on the elongated elastic inner layer to obtain a semifinished hose; c) extruding an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by an extruding station, and the elastic textile reinforcement layer placed on the outer surface of the elongated elastic inner layer by braiding station to obtain a semifinished hose, then the elastic outer layer extruding on the semifinished hose by extruding station to form a unitary tubular member, as shown in FIG. 18.

Embodiment 22

The hose mentioned in embodiment 15-20 can be manufactured by a method which may include in sequence the following steps: a) providing an elastic inner layer formed by extruding; b) elongating 2 times of the elastic inner layer with respect to its original length, and placing an elastic textile reinforcement layer on the elongated elastic inner layer to obtain a semifinished hose; c) coating an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by an extruding station, and the elastic textile reinforcement layer placed on the outer surface of the elongated elastic inner layer by braiding station to obtain a semifinished hose, then the elastic outer layer coating on the semifinished hose by coating station to form a unitary tubular member, as shown in FIG. 16.

Embodiment 23

The hose mentioned in embodiment 15-20 can be manufactured by a method which may include in sequence the following steps: a) providing an elastic inner layer formed by coating; b) elongating 4 times of the elastic inner layer with respect to its original length, and placing an elastic textile reinforcement layer on the elongated elastic inner layer to obtain a semifinished hose; c) coating an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of coating an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by a coating station, and the elastic textile reinforcement layer placed on the outer surface of the elongated elastic inner layer by braiding station to obtain a semifinished hose, then the elastic outer layer coating on the semifinished hose by coating station to form a unitary tubular member, as shown in FIG. 15.

Embodiment 24

The hose mentioned in embodiment 15-20 can be manufactured by a method which may include in sequence the following steps: a) providing an elastic inner layer formed by coating; b) elongating 7 times of the elastic inner layer with respect to its original length, and placing an elastic textile reinforcement layer on the elongated elastic inner layer to obtain a semifinished hose; c) extruding an elastic outer layer on the semifinished hose.

Preferably, the step b) of placing an elastic textile reinforcement layer includes a step of the elastic textile reinforcement layer reciprocally coupling to the outer surface of elongated elastic inner layer to obtain a semifinished hose.

Preferably, the step c) of extruding an elastic outer layer includes a step of the one elastic outer layer and the surface area of the one elastic inner layer not covered by the elastic textile reinforcement layer being reciprocally joined to form a unitary tubular member.

Preferably, the manufacturing method includes a production line, the production line set up by the combination of a selected group consisting of extruding station 20, braiding station 30, coating station 40.

Advantageously, the elastic inner layer formed by a coating station, and the elastic textile reinforcement layer placed on the outer surface of the elongated elastic inner layer by braiding station to obtain a semifinished hose, then the elastic outer layer extruding on the semifinished hose by extruding station to form a unitary tubular member, as shown in FIG. 17.

Obviously, for those skilled in the prior art, the present invention is not limited to the above embodiments, and the present invention can be realized in other specific forms without departing from the spirit and essential characteristics of the present invention. Therefore, the present invention should be considered as exemplary, but not for limiting. The scope of the present invention is limited by the appended claims rather than the above description, therefore, the embodiments aim to include all changes that fall within the meaning and range of equivalents of the claims.

Moreover, it should be understood that although the description has described in terms of embodiments, it doesn't mean that each embodiment only includes one separated technical solution, and the description way of the present invention is merely for the sake of clarity. The specification shall be considered as a whole by those skilled in the prior art, and the technical solutions in different embodiments can be properly combined to form other embodiments which can be understood by those skilled in the prior art. It should be noted that the technical features which are not described in detail in the present invention can be complemented by the prior art.

We claim:

1. An extensible flexible hose, comprising:
   one elastic inner layer, one elastic textile reinforcement layer, and one elastic outer layer;
   wherein the elastic textile reinforcement layer is placed on an outer surface of said elastic inner layer, and the elastic outer layer is disposed on said elastic textile reinforcement layer;
   wherein said elastic inner layer and said elastic textile reinforcement layer are reciprocally coupled, said elastic outer layer and surface areas of said elastic inner layer not covered by the elastic textile reinforcement layer are reciprocally joined to form a unitary tubular structure; and
   wherein said elastic textile reinforcement layer comprises a twill weave textile layer that includes twill, is prepared by twilled weaving and further includes stretch yarns longitudinally distributed and interlaced with one another inside the twill weave textile layer, and the twill weave textile layer is configured to restrain radial enlargement but to yield in an axial direction of the extensible flexible hose.

2. The hose according to claim 1,
   wherein said elastic textile reinforcement layer has an axial elasticity and a radial constraint force, that allows said elastic textile reinforcement layer automatically elongating and restricts said elastic textile reinforcement layer from automatically enlarging under working pressure.

3. The hose according to claim 2, wherein said elastic textile reinforcement layer increases its length under working pressure of at maximum 7 times with respect to its original length.

4. The hose according to claim 1, wherein the number of said stretch yarns among said elastic textile reinforcement layer ranges from 8 to 96, the diameter of said stretch yarn ranges from 0.25 mm to 2 mm.

5. The hose according to claim 1, wherein said twill weave textile layer being made of a material selected from the group consisting of polyester, polypropylene, nylon and acrylic fibres;
   Wherein the yarn counts of said material using in said twill weave textile layer ranges from 10 D to 5000 D.

6. The hose according to claim 1, wherein said elastic inner layer is made of thermoplastic elastomer material or rubber material, and the inner diameter of said elastic inner layer ranges from 3 mm to 95 mm, and the external diameter of said elastic inner layer ranges from 3.2 mm to 100 mm, and the thickness of said elastic inner layer ranges from 0.2 mm to 10 mm;

wherein said elastic outer layer is made of thermoplastic elastomer material or rubber material, and the thickness of said elastic outer layer ranges from 0.2 mm to 10 mm.

7. The hose according to claim 1, wherein two ends of said unitary tubular structure are respectively provided with a joint, said joint comprising:

a convex connector, a pawl type snap joint, a locking piece;

wherein said convex connector inserted into the end of said unitary tubular member, said pawl type snap joint connected to the exterior of said unitary tubular member, said locking piece fastened on the exterior of said pawl type snap joint;

wherein said convex connector is a hollow structural connector, comprising:

a body part, a convex part, a spacing part, a screw thread part;

wherein said body part connected with said convex part, the end of said convex part connected with said spacing part, said screw thread part set on the exterior of said body part, said screw thread part also connected with said locking piece;

wherein said joint designed to be removably connected with said unitary tubular member.

8. The hose according to claim 7, wherein said joint provided with one of the following connector structures at an end away from the said unitary tubular member: a quick-connect connection structure, an internally threaded joint structure or an externally threaded joint structure.

* * * * *